United States Patent
Aksyuk et al.

(10) Patent No.: US 6,993,219 B2
(45) Date of Patent: Jan. 31, 2006

(54) WAVEGUIDE/MEMS SWITCH

(75) Inventors: Vladimir A. Aksyuk, Piscataway, NJ (US); Ho Bun Chan, Summit, NJ (US); Dan Fuchs, Summit, NJ (US); Dennis S. Greywall, Whitehouse Station, NJ (US); Maria E. Simon, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 48 days.

(21) Appl. No.: 10/387,852

(22) Filed: Mar. 13, 2003

(65) Prior Publication Data

US 2004/0179773 A1 Sep. 16, 2004

(51) Int. Cl.
*G02B 6/35* (2006.01)
(52) U.S. Cl. .......................... 385/18; 385/21
(58) Field of Classification Search .................. 383/18, 383/16, 17, 19, 25; 359/223, 196
See application file for complete search history.

(56) References Cited

U.S. PATENT DOCUMENTS

| | | | |
|---|---|---|---|
| 4,420,729 A * | 12/1983 | Ashforth | 333/159 |
| 4,710,733 A * | 12/1987 | Crill et al. | 332/144 |
| 5,062,689 A | 11/1991 | Koehler | 359/230 |
| 5,501,893 A | 3/1996 | Laermer et al. | |
| 5,629,790 A | 5/1997 | Neukermans et al. | |
| 5,745,218 A * | 4/1998 | Sugahara et al. | 355/40 |
| 5,745,281 A | 4/1998 | Yi et al. | 359/290 |
| 6,075,239 A * | 6/2000 | Aksyuk et al. | 250/229 |
| 6,201,631 B1 | 3/2001 | Greywall | |
| 6,220,561 B1 | 4/2001 | Garcia | 310/309 |
| 6,229,640 B1 | 5/2001 | Zhang | 385/16 |
| 6,304,709 B1 * | 10/2001 | Fujita | 385/140 |
| 6,404,969 B1 * | 6/2002 | Tayebati et al. | 385/18 |
| 2001/0024556 A1 * | 9/2001 | Beguin et al. | 385/125 |
| 2002/0005976 A1 | 1/2002 | Behin et al. | 359/254 |
| 2002/0176654 A1 * | 11/2002 | Boger et al. | 385/17 |
| 2003/0012509 A1 * | 1/2003 | Chang et al. | 385/50 |
| 2003/0058520 A1 * | 3/2003 | Yu et al. | 359/291 |
| 2003/0095777 A1 * | 5/2003 | Janssen | 385/15 |
| 2003/0161574 A1 * | 8/2003 | Aksyuk et al. | 385/16 |
| 2004/0156580 A1 * | 8/2004 | Baumann et al. | 385/16 |

FOREIGN PATENT DOCUMENTS

GB     2 351 185     * 12/2000

\* cited by examiner

*Primary Examiner*—Brian Healy
*Assistant Examiner*—James P. Hughes

(57) ABSTRACT

A waveguide/MEMS switch adapted to redirect optical signals between output ports based on a phase shift change generated by motion of one or more movable MEMS mirrors incorporated therein. Advantageously, such a switch has a relatively high switching speed and low power consumption. A switch according to one embodiment of the invention includes a planar waveguide device and a planar MEMS device. The MEMS device implements in-plane (i.e., parallel to the plane of that device) translation of the mirrors. As a result, in certain embodiments of the switch, the waveguide and MEMS devices are connected into a compact planar assembly.

24 Claims, 8 Drawing Sheets

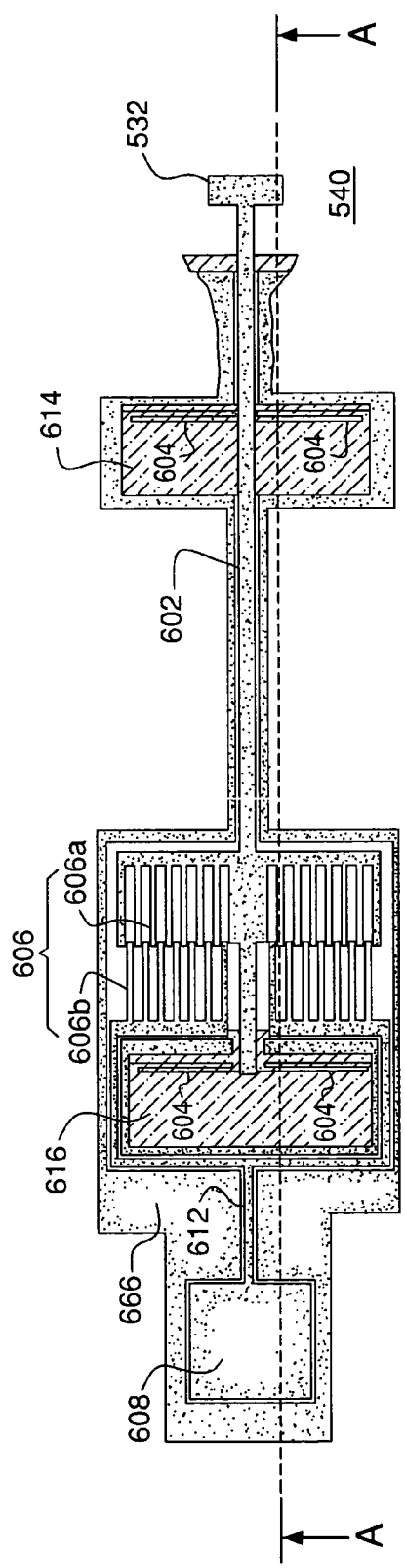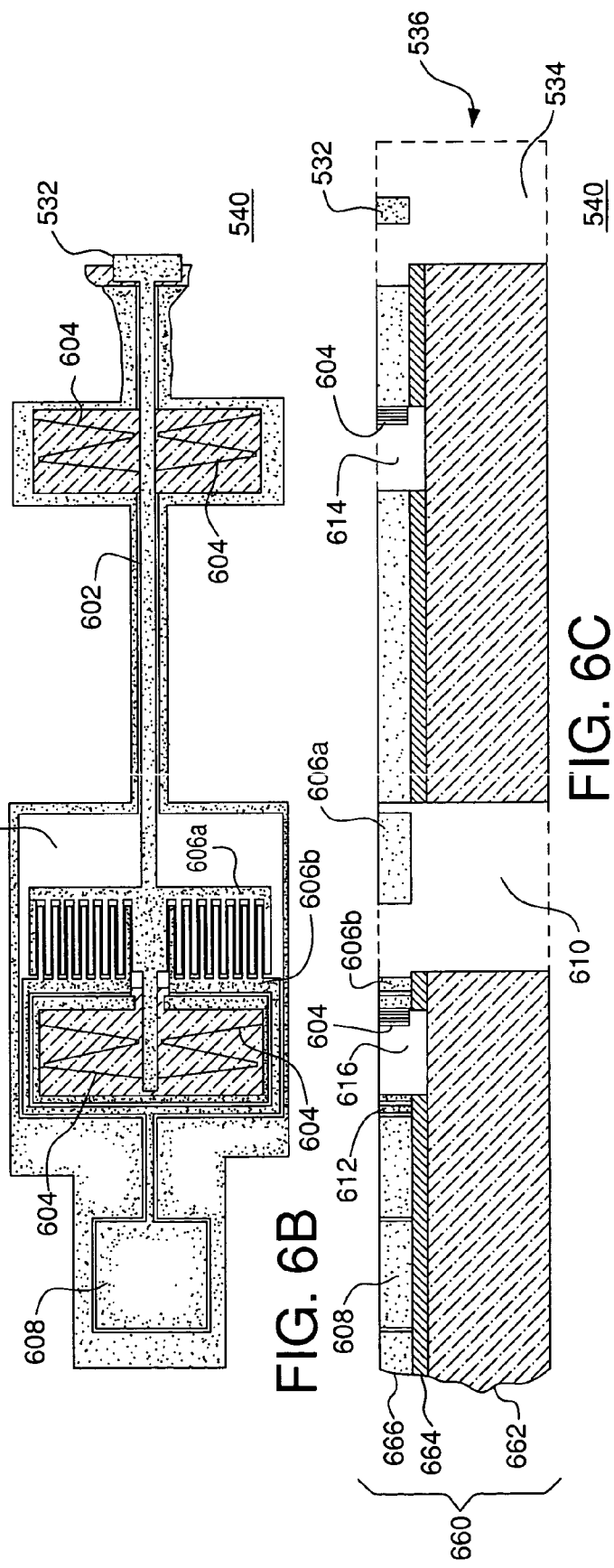

WAVEGUIDE/MEMS SWITCH

CROSS REFERENCE TO RELATED APPLICATIONS

The subject matter of this application is related to that of U.S. patent application Ser. No. 10/081,498, filed Feb. 22, 2002, and entitled "Planar Lightwave Wavelength Device Using Movable Mirrors," and U.S. patent application Ser. No. 10/153,294, filed May 22, 2002, and entitled "Monolithic In-Plane Shutter Switch," the teachings of both of which are incorporated herein by reference.

BACKGROUND OF THE INVENTION

1. Field of the Invention

The present invention relates to optical communication equipment and, more specifically, micro-electromechanical systems (MEMS) and planar waveguide devices for use in such equipment.

2. Description of the Related Art

Optical communication systems often employ devices that use optical waveguides to confine and direct light and to process optical signals. A representative waveguide device may be an optical cross-connect, a router, a modulator, etc. Waveguide devices often include optical switches such as a 2×2 switch. A 2×2 switch has two input ports and two output ports and operates such that an optical signal applied to either one of the two input ports can be directed to either one of the two output ports.

A 2×2 waveguide switch may be implemented using a Mach-Zehnder interferometer, a device well known in the art. However, one problem with Mach-Zehnder interferometer switches is that they are thermally actuated. That is, the output port of the switch is changed by changing the temperature of the interferometer arms. Since heating/cooling is a relatively slow process, the switching speed is correspondingly low. In addition, thermal actuation entails power consumption, which might become significant in systems having a relatively large number of switches and/or limited power.

SUMMARY OF THE INVENTION

The problems in the prior art are addressed in accordance with the principles of the present invention by a waveguide/MEMS switch adapted to redirect optical signals between output ports based on a phase shift change generated by motion of one or more movable MEMS mirrors incorporated therein. Advantageously, such a switch has a relatively high switching speed and low power consumption. A switch according to one embodiment of the invention includes a planar waveguide device and a planar MEMS device. The MEMS device implements in-plane (i.e., parallel to the plane of that device) translation of the mirrors. As a result, in certain embodiments of the switch, the waveguide and MEMS devices are connected into a compact planar assembly.

BRIEF DESCRIPTION OF THE DRAWINGS

FIGS. 6A–C show enlarged top and cross-sectional views of a mechanism used in the MEMS device of FIG. 5;

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
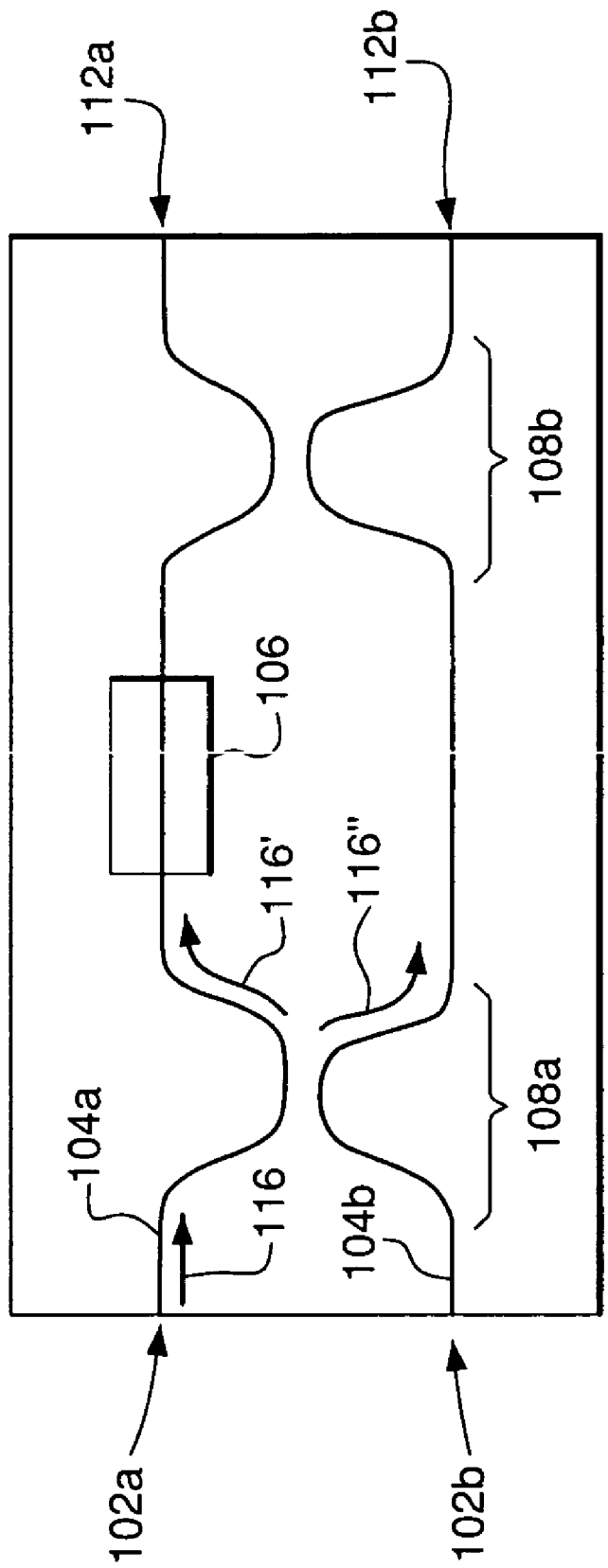
FIG. 1 schematically shows a prior art Mach-Zehnder interferometer switch.

FIG. 1 schematically shows a representative prior art Mach-Zehnder interferometer switch 100. Switch 100 includes two waveguides 104a–b, which couple two input ports 102a–b of the switch to its two output ports 112a–b. Waveguides 104a–b are laid out to form two 3-dB couplers 108a–b, each of which is formed by proximate portions of the two waveguides. Each coupler 108 is designed to couple one half of the optical power from one waveguide into the other. This coupling is accompanied by a 90-degree phase shift. For example, coupler 108a splits signal 116 applied to input port 102a into two copies 116' and 116" such that copy 116' preserves the phase of signal 116 and copy 116" is a phase-shifted copy. The copies then recombine in coupler 108b.

Switch 100 further includes a thermo-optic phase shifter 106 configured to introduce a relative phase shift ($\Delta\phi$) between signal copies in waveguides 104a–b. The phase shift is controlled thermally, e.g., by elevating the temperature of the portion of waveguide 104a located within phase shifter 106. A temperature change induces an index of refraction change, which produces the phase shift. Depending on the relative phase shift, signal copies from waveguides 104a–b recombine in coupler 108b such that the recombined signal may emerge from either one of output ports 112a–b. For example, when $\Delta\phi=0°$, copies 116' and 116" interfere constructively in waveguide 104b and destructively in waveguide 104a. As a result, signal 116 is routed to output port 112b. Similarly, when $\Delta\phi=180°$, the copies interfere constructively in waveguide 104a and destructively in waveguide 104b, which routes signal 116 to output port 112a. Changing the relative phase shift by 180° will therefore cause switch 100 to reroute (switch) an optical signal from one output port to the other.

As already mentioned above, one problem with switch 100 is that its switching speed is relatively low. Since heating/cooling in phase shifter 106 is required for signal switching, the switching speed is limited by heat exchange, which is an inherently slow process. Another problem is that thermal actuation of phase shifter 106 entails power consumption, which might become significant in systems having a relatively large number of switches 100 and/or limited power.

Figure 2:
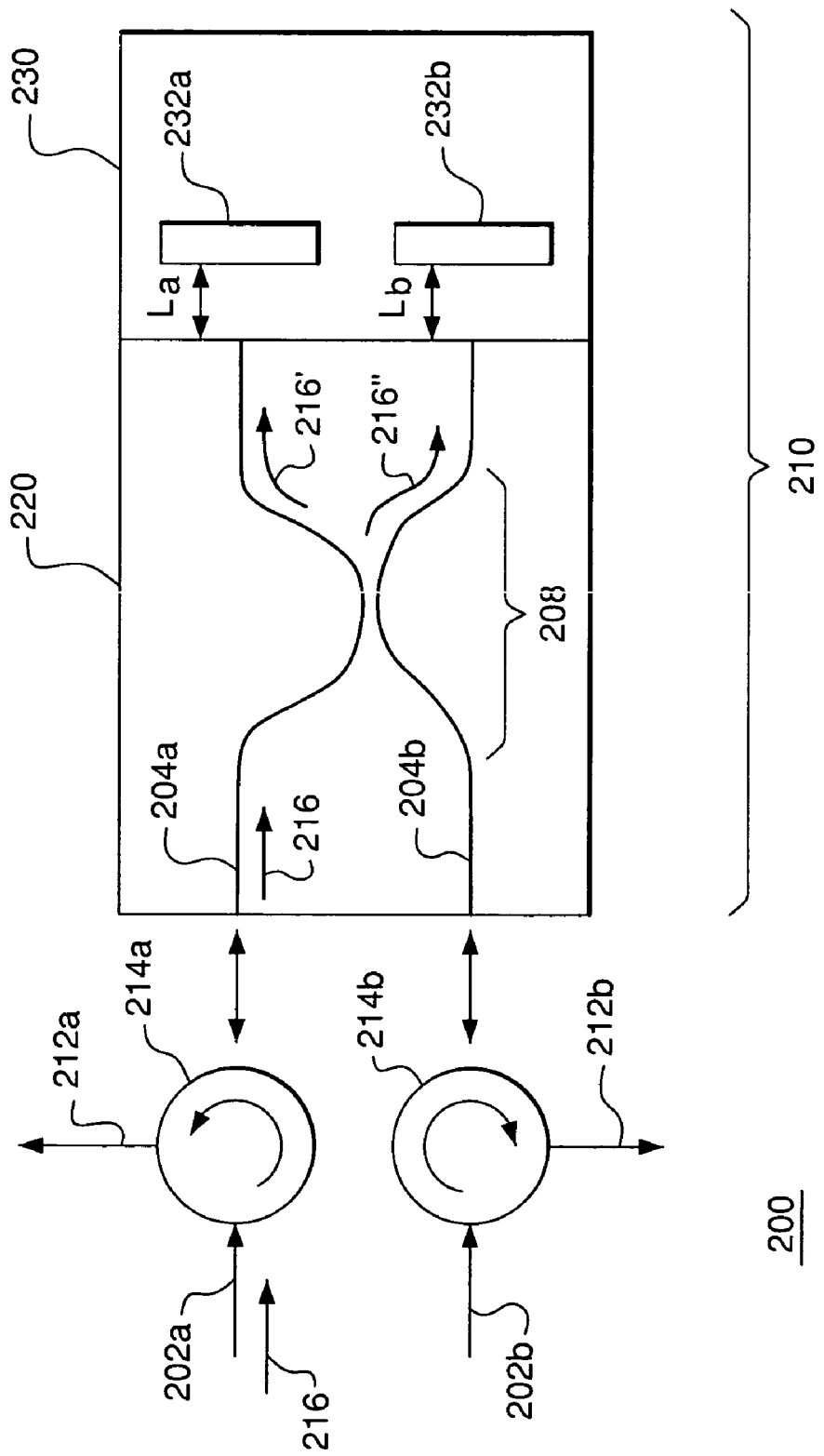
FIG. 2 schematically shows a 2×2 switch according to one embodiment of the present invention.

FIG. 2 schematically shows a 2×2 switch 200 according to one embodiment of the present invention. Switch 200 has two input ports 202a–b and two output ports 212a–b and includes (i) two optical circulators 214a–b and (ii) a waveguide/MEMS assembly 210. Each circulator 214 directs incoming light from input port 202 to assembly 210 and outgoing light from assembly 210 to output port 212 as known in the art. Assembly 210 comprises a waveguide device 220 and a MEMS device 230 coupled together. Waveguide device 220 has two waveguides 204a–b forming a 3-dB coupler 208, which is similar to coupler 108 of switch 100. MEMS device 230 has two movable mirrors 232a–b, each positioned with respect to the corresponding waveguide 204 such that light exiting waveguide 204 is reflected by the mirror back into that waveguide. Therefore, light passes through waveguides 204a–b two times before it exits switch 200. In FIG. 2, mirrors 232a–b are illustratively shown at distances $L_a$ and $L_b$, respectively, from the termini of waveguides 204a–b. Each mirror 232 can be independently translated to change the corresponding distance $L_{a,b}$.

Similar to phase shifter 106 in switch 100, mirrors 232a–b in switch 200 are able to generate a relative phase shift ($\Delta\phi$) between signal copies in waveguides 204a–b. More specifically, the value of $\Delta\phi$ is determined by the distance difference ($\Delta L = L_a - L_b$) for mirrors 232a–b, which can be changed by translating either one of the mirrors or both. On the backward (i.e., second) pass through waveguides 204a–b, the signal copies recombine in coupler 208 such that, depending on $\Delta L$, the recombined signal may emerge from either one of the waveguides and, then, be directed by the corresponding circulator 214 to the corresponding output port 212.

For example, let us consider an optical signal 216 applied to input port 202a as shown in FIG. 2. Circulator 214a directs signal 216 into waveguide 204a. Then, in coupler 208, signal 216 is split into two copies 216' and 216". Each signal copy exits the corresponding waveguide 204, reflects off the corresponding mirror 232, and reenters the same waveguide. On the backward pass through waveguides 204a–b, copies 216' and 216" recombine in coupler 208. Similar to the above described recombination of copies 116' and 116" in coupler 108b of switch 100, the recombination of copies 216' and 216" in coupler 208 may be constructive for waveguide 204a and destructive for waveguide 204b, or vice versa. For example, when $\Delta L=0$, $\Delta\phi=0°$. This produces constructive interference of copies 216' and 216" in waveguide 204b and causes the recombined signal to emerge from that waveguide. The signal is then directed to output port 212b by circulator 214b. Similarly, when $\Delta L=\lambda_{216}/4$ (where $\lambda_{216}$ is wavelength of light corresponding to signal 216), $\Delta\phi=180°$, which causes constructive interference of copies 216' and 216" in waveguide 204a and the recombined signal to emerge from that waveguide. The signal is then directed by circulator 214a to output port 212a. For $\lambda_{216}=1.5$ $\mu$m, translation of one mirror in switch 200 by about 0.4 $\mu$m will be sufficient to switch signal 216 between output ports 212a and 212b.

Compared to switch 100 (FIG. 1), switch 200 may have higher switching speed. Speed limitations in MEMS devices such as device 230 are determined largely by the resonant frequency of an actuator, which is related to the actuator dimensions. Since the actuator in device 230 can be relatively small, it will have a relatively high resonance frequency. As a result, an optical signal in switch 200 can be switched in significantly less time than the time necessary to generate a temperature change for phase shifter 106 in switch 100. In addition, power consumption in switch 200 can be significantly less than that in switch 100 due to the very low power requirements for electrostatic actuators that can be employed in MEMS device 230.

Figure 3B:
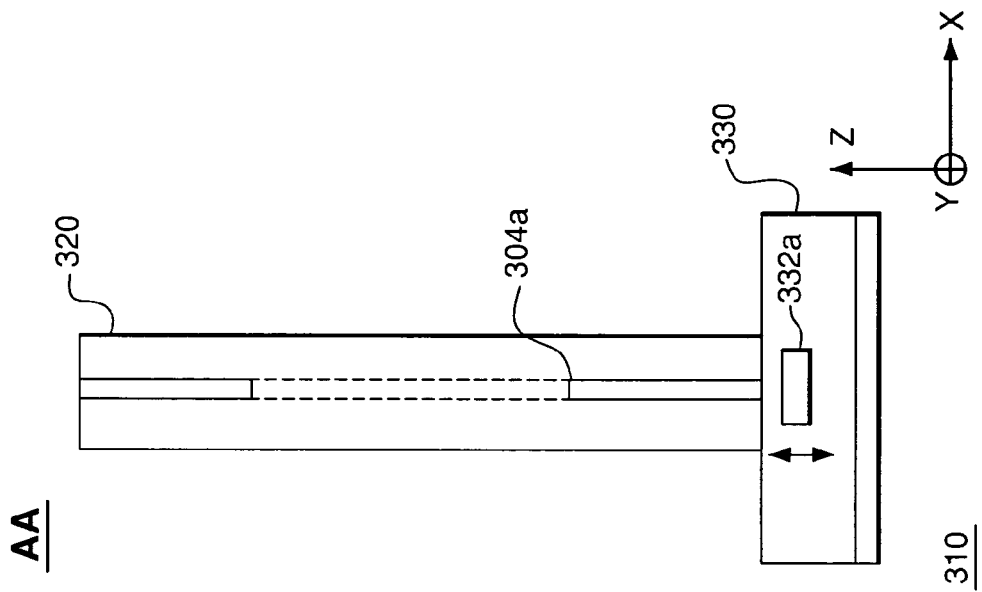
FIGS. 3A–B schematically show top and cross-sectional views of an orthogonal waveguide/MEMS assembly that can be used in the switch of FIG. 2 according to one embodiment of the present invention.
Figure 3A:
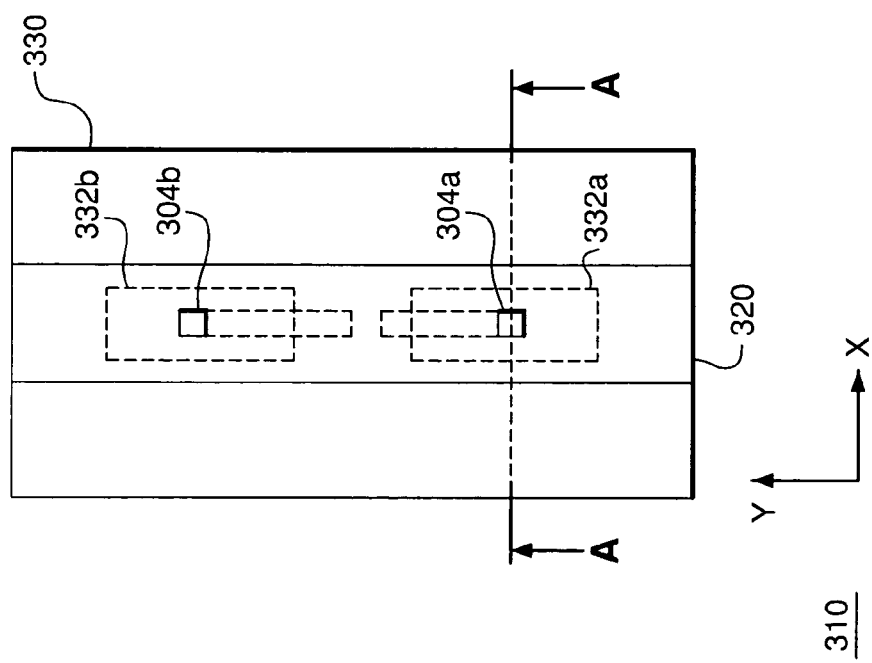

FIGS. 3A–B schematically show top and cross-sectional views, respectively, of an orthogonal waveguide/MEMS assembly 310 that can be used as assembly 210 in switch 200 according to one embodiment of the present invention. Assembly 310 includes a planar waveguide device 320 connected to a planar MEMS device 330 such that the planes of these devices are substantially orthogonal as shown in FIG. 3B. In this specification, a device referred to as a planar device has two dimensions (e.g., the length and width) that are significantly larger than the third dimension (e.g., the height) of that device. Waveguide device 320 has two waveguides 304a–b, the layout of which is similar to that of waveguides 204a–b shown in FIG. 2. MEMS device 330 has two movable mirrors 332a–b designed for out-of-plane motion, i.e., motion perpendicular to the XY plane as indicated by the double-headed arrow in FIG. 3B. A more detailed description of certain embodiments of assembly 310 can be found in the above-cited, commonly owned U.S. patent application Ser. No. 10/081,498, the teachings of which are incorporated herein by reference.

Figure 4:
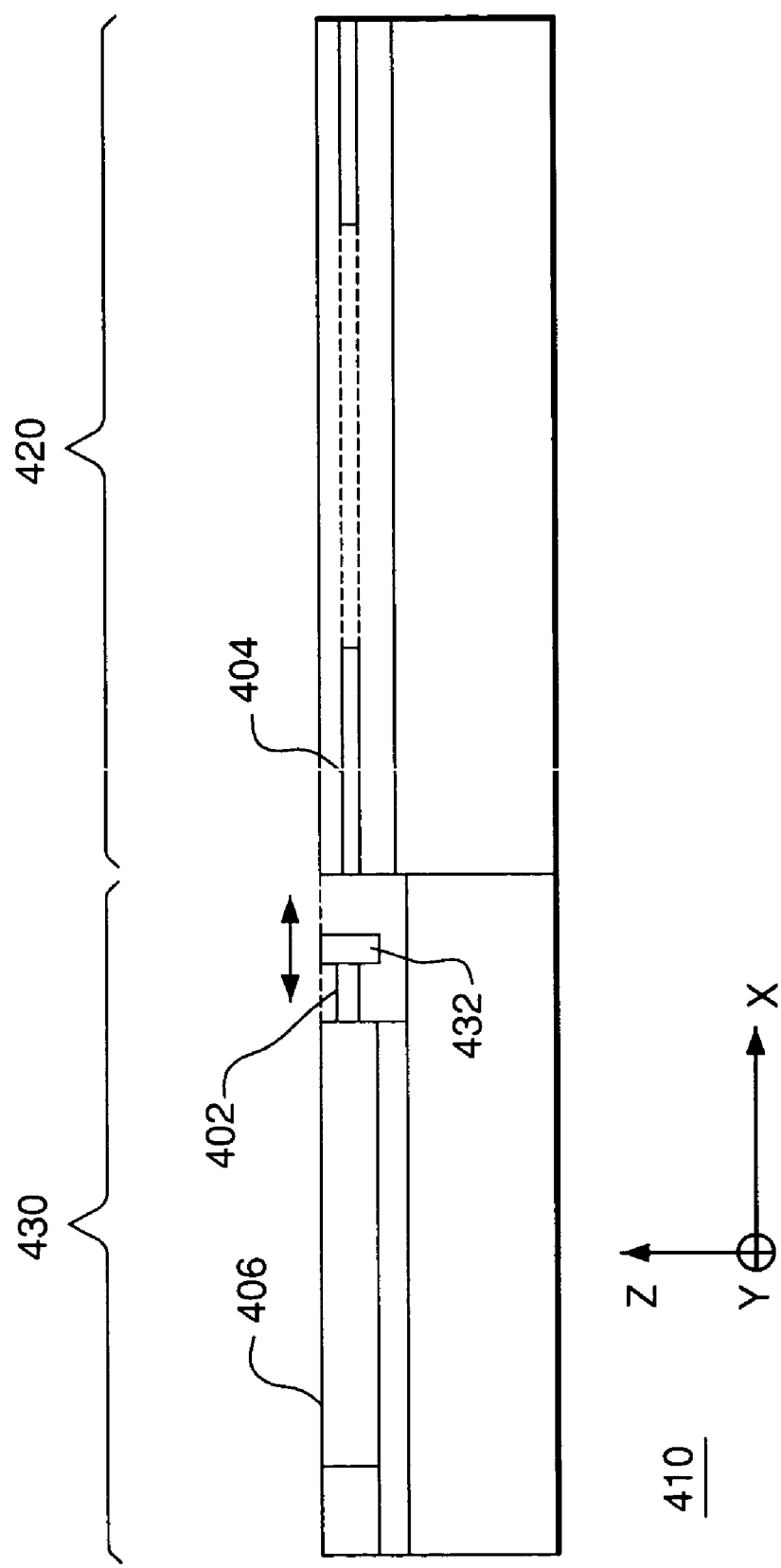
FIG. 4 schematically shows a cross-sectional view of a planar waveguide/MEMS assembly that can be used in the switch of FIG. 2 according to another embodiment of the present invention.

FIG. 4 schematically shows a cross-sectional view of a planar waveguide/MEMS assembly 410 that can be used as assembly 210 in switch 200 according to another embodiment of the present invention. Assembly 410 includes a planar waveguide device 420 connected to a planar MEMS device 430, where the plane of device 420 is parallel to the plane of device 430. Waveguide device 420 is similar to waveguide device 320 and has two waveguides, one of which, waveguide 404a, can be seen in the cross section shown in FIG. 4. MEMS device 430 has two movable mirrors, one of which, mirror 432, can be seen in the cross section shown in FIG. 4. Each mirror 432 is designed for in-plane motion, i.e., motion parallel to the XY plane, within the plane of device 430 as indicated by the double-headed arrow in FIG. 4. This motion is actuated using a corresponding electrostatic actuator 406, to which mirror 432 is connected by a corresponding shaft 402. Since the structure of assembly 410 is substantially planar, it is relatively easy to assemble and the envelope of the assembly has a smaller volume than that of orthogonal assembly 310 (FIG. 3).

Figure 5:
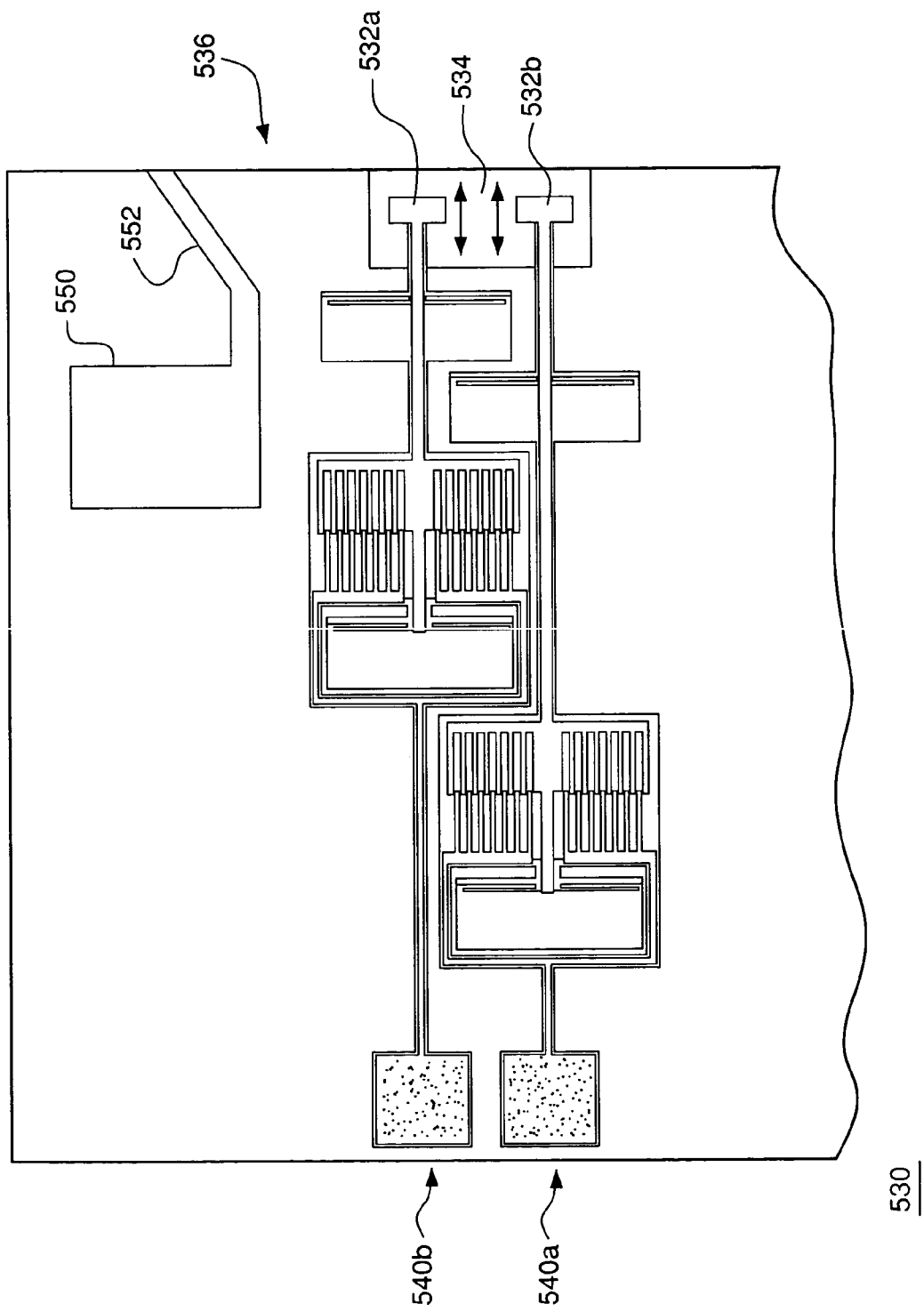
FIG. 5 schematically shows a top view of a MEMS device that can be used in the planar waveguide/MEMS assembly of FIG. 4 according to one embodiment of the present invention.

FIG. 5 schematically shows a top view of a MEMS device 530 that can be used as device 430 in assembly 410 of FIG. 4 according to one embodiment of the present invention. Device 530 has two mirror mechanisms 540a–b, each of which includes a movable mirror 532 designed for in-plane motion as represented by the double-headed arrows in FIG. 5. Mirrors 532a–b are located in a recess 534, which exposes the mirror's reflecting surface at an edge 536 of device 530. In one embodiment, edge 536 is attached to an edge of waveguide device 420 using glue. To avoid glue overflow into recess 534 during the attachment procedure, device 530 has a reservoir 550 connected to edge 536 by a canal 552. The excess glue, which flows along edge 536 toward recess 534 when the two devices are pressed together, enters canal 552 and is trapped in reservoir 550.

FIGS. 6A–C show enlarged top and cross-sectional views of mechanism 540. More specifically, FIGS. 6A–B show top views of mechanism 540 corresponding to two different positions of mirror 532. FIG. 6C shows a cross-sectional view of mechanism 540 along the plane designated AA in FIG. 6A.

Referring now to FIGS. 6A and 6C, mechanism 540 is preferably fabricated using a silicon-on-insulator (SOI) wafer 660 comprising three layers: a silicon substrate layer 662, a thin silicon oxide insulating layer 664, and a silicon overlayer 666. Mechanism 540 comprises mirror 532 supported in recess 534 by a drive shaft 602 connected to overlayer 666 by four springs 604. Mirror 532 may have a reflective metal coating (not shown) deposited on the side facing edge 536. Mechanism 540 further comprises a comb drive actuator 606 including (i) a movable portion 606a connected to shaft 602 and (ii) a stationary portion 606b attached to layer 664 and supported above cavity 610. Cavity 610 may penetrate wafer 660 as shown in FIG. 6C or, alternatively, be formed by removing the corresponding portion of insulating layer 664 while keeping the corresponding underlying portion of substrate layer 662. Shaft 602 and portion 606a of actuator 606 are detached from the underlying layers 662 and 664 to permit in-plane motion of the shaft and mirror 532. Cavities 614 and 616 are formed in overlayer 666 and insulating layer 664 to accommodate the expansion of springs 604 during that motion.

Portion 606b of actuator 606 is electrically connected to a contact pad 608 using a contact track 612. Portion 606b of actuator 606, track 612, and pad 608 are electrically isolated from the rest of the mechanism structure using the underlying insulation of layer 664 and the surrounding grooves in overlayer 666. In contrast, portion 606a of actuator 606 is in electrical contact with overlayer 666 via shaft 602 and springs 604. Thus, a voltage differential can be applied between portions 606a–b of actuator 606. In one configuration, layers 662 and 666 may be connected to a negative terminal of a voltage source (e.g., ground), whereas pad 608 may be connected to a positive terminal of that voltage source configured to apply a voltage differential between portions 606a–b of actuator 606. Contact pad 608 may be metal-plated as known in the art for better ohmic contact with a wire lead (not shown).

Referring now to FIGS. 6A and 6B, mechanism 540 may be operated as follows. When no voltage is applied between portions 606a–b of actuator 606, springs 604 are in a contracted state thus holding mirror 532 in a right-side position as shown in FIG. 6A. When voltage is applied between portions 606a–b of actuator 606, e.g., as explained above, an attractive electrostatic force is exerted between the portions causing movable portion 606a to move toward stationary portion 606b. As a result, mirror 532 moves to an equilibrium position as shown in FIG. 6B, in which the electrostatic force is compensated by the spring restoring forces of deformed springs 604. In the equilibrium position, springs 604 are expanded into corresponding cavities 614 and 616. The equilibrium position can be changed by changing the voltage applied between portions 606a–b of actuator 606. When the voltage is removed, the restoring force will return portions 606a–b of actuator 606, shaft 602, and mirror 532 back to the positions shown in FIG. 6A.

Different techniques may be used to process wafer 660 during fabrication of mechanism 540. For example, a reactive ion etching (RIE) fabrication method may be used. Various parts of mechanism 540 may be mapped onto the corresponding layer using lithography. Additional description of various fabrication steps may be found, for example, in U.S. Pat. Nos. 6,201,631, 5,629,790, and 5,501,893 as well as in the above-cited, commonly owned U.S. patent application Ser. No. 10/153,294, the teachings of all of which are incorporated herein by reference. In particular, honeycomb well patterns described in the '294 application may be formed in shaft 602 to detach the shaft from substrate layer 662 and insulating layer 664 of wafer 660.

In one embodiment, the plane of wafer 660 corresponds to a (110) crystallographic plane of silicon layer 666. As a result, the side of mirror 532 facing edge 536 (FIG. 6C) is a (111) crystallographic plane. It is known in the art that wet etching produces very flat (111) silicon surfaces. Therefore, using a (110)-oriented SOI wafer for mechanism 540 will produce an advantageously flat reflecting surface for mirror 532.

Figure 7:
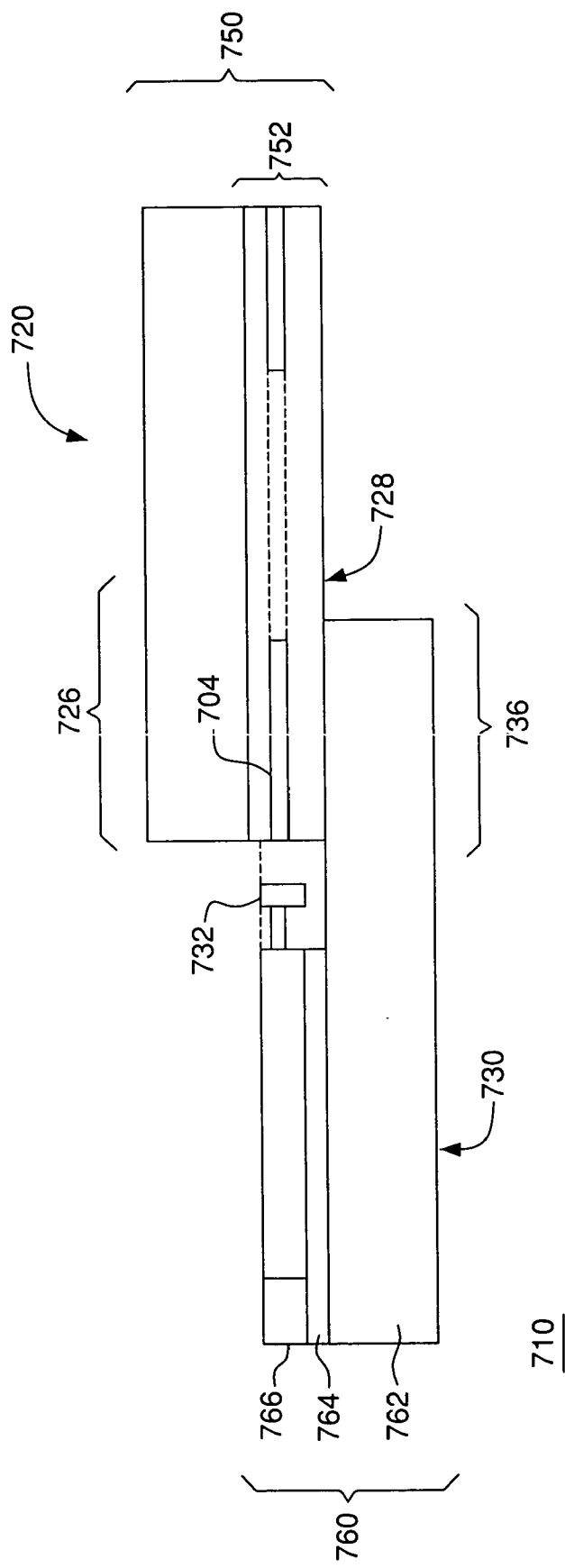
FIG. 7 schematically shows a cross-sectional view of a stacked waveguide/MEMS assembly that can be used in the switch of FIG. 2 according to yet another embodiment of the present invention.

FIG. 7 schematically shows a cross-sectional view of a stacked waveguide/MEMS assembly 710 that can be used as assembly 210 in switch 200 according to yet another embodiment of the present invention. Similar to assembly 410 of FIG. 4, assembly 710 includes a planar waveguide device 720 and a planar MEMS device 730 attached together. However, in contrast with assembly 410, the planar devices of assembly 710 are attached by overlapping terminal portions of those devices as shown in FIG. 7. By appropriately processing those terminal portions the area of attachment in stacked assembly 710 may be significantly larger than that in planar assembly 410. As a result, a more robust bond between the planar devices may be achieved in stacked assembly 710 compared to that in planar assembly 410, while preserving the compact, substantially planar structure of the assembly.

Waveguide device 720 and MEMS device 730 are preferably fabricated using a silica waveguide wafer 750 and an SOI wafer 760, respectively. A terminal portion 736 of wafer 760 is processed to remove an overlayer 766 and an insulating layer 764 and to expose a substrate layer 762. An outside surface 728 of a terminal portion 726 of wafer 750 may be polished to adjust the thickness of a silica waveguide layer 752 for alignment of a waveguide 704 located in that layer with a movable mirror 732 of MEMS device 730. Wafer 750 is flipped over such that silica waveguide layer 752 faces substrate layer 762 of wafer 760. Wafers 750 and 760 are then attached by gluing together terminal portions 726 and 736 as shown in FIG. 7. The gluing can, for example, be performed using a flip-chip bonding machine that enables accurate alignment of wafers 750 and 760.

Figure 8B:
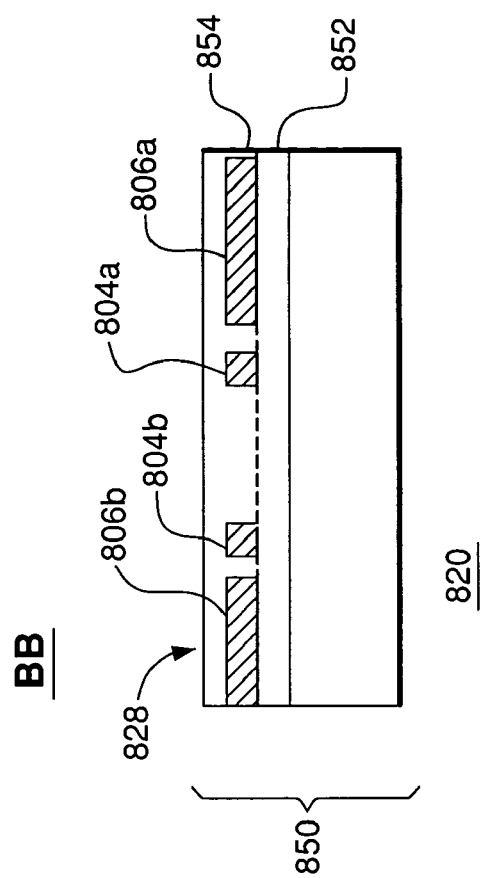
FIGS. 8A–B schematically show top and cross-sectional views of a waveguide device that can be used in the stacked waveguide/MEMS assembly of FIG. 7 according to one embodiment of the present invention.
Figure 8A:
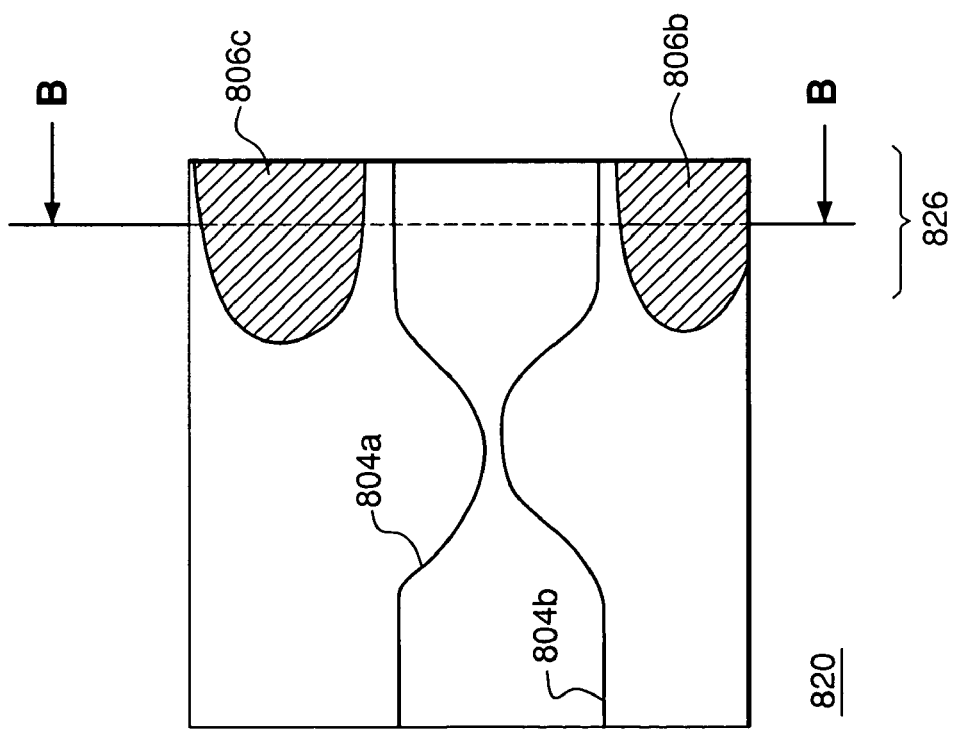

FIGS. 8A–B schematically show top and cross-sectional views of a waveguide device 820 that can be used as waveguide device 720 in stacked assembly 710 of FIG. 7 according to one embodiment of the present invention. More specifically, FIG. 8A shows a top view of device 820, and FIG. 8B shows a cross-sectional view of device 820 along the plane designated BB in FIG. 8A. Device 820 includes two waveguides 804a–b formed, e.g., by sandwiching core traces of doped (e.g., with phosphorus) silica glass between a first cladding layer 852 and a second cladding layer 854. Since second cladding layer 854 is typically uniformly deposited over entire wafer 850, the flatness of its outer surface 828 is affected by the presence of those core traces. As a result, surface 828 may have elevated portions substantially following the topography of waveguides 804. These elevated portions may form conduits, following which the glue can arrive at a terminal portion 826 of device 820 and possibly overflow into the adjacent mirror recesses of the MEMS device, which would damage the waveguide/

MEMS assembly. To avoid this effect, device 820 includes spacer regions 806a–b located outside the waveguide area in terminal portion 826 of device 820. Spacer regions 806 are preferably formed similar to waveguides 804a–b and therefore produce the corresponding elevated portions on surface 828, which improve the topology of said surface and facilitate the attachment of waveguide device 820, for example, to MEMS device 730 as illustrated in FIG. 7. More specifically, during the attachment procedure, glue is deposited only onto the elevated portions corresponding to spacer regions 806. Since the spacer regions are located outside the waveguide area, possible glue overflow would not affect the mirror area of the MEMS device in the assembly having waveguide device 820.

Although fabrication of switches of the present invention has been described in the context of using SOI and silica waveguide wafers, wafers comprising other suitable materials may similarly be used. The materials may be appropriately doped as known in the art. Various surfaces may be modified, e.g., by metal deposition for enhanced reflectivity and/or electrical conductivity or by ion implantation for enhanced mechanical strength. Differently shaped drive actuators, springs, and/or mirror support structures may be implemented without departing from the scope and principle of the present invention. Support structures may include one or more differently configured springs, where the term "spring" refers in general to any suitable elastic structure that can recover its original shape after being distorted. Two or more drive actuators per mirror may be used, for example, to implement a pull/push arrangement for the in-plane mirror translation. In certain embodiments, a waveguide/MEMS switch of the invention may have, instead of two movable mirrors, one movable mirror and one stationary mirror.

A planar MEMS device of the invention may be configured to generate any phase shift (in addition to 0 and 180 degrees) within the working translation range of movable mirrors based on the appropriate selection of voltages applied to electrostatic actuators. Individual switches of the invention may be differently arrayed to provide switching for multiple communication channels. An arrayed switch may be formed using an arrayed MEMS device attached to a complementary arrayed waveguide device. The arrayed MEMS device may be fabricated using a single wafer, in which multiple MEMS devices are appropriately formed. Similarly, the arrayed waveguide device may be fabricated using a single waveguide wafer.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

What is claimed is:

1. An apparatus, comprising:
  a planar waveguide device;
  a planar MEMS device;
  first and second input ports;
  first and second output ports; and
  first and second optical circulators, wherein:
    the MEMS device includes a movable mirror optically coupled to a waveguide of the waveguide device and adapted to move parallel to the plane of the MEMS device;
    the apparatus is adapted to process light based on phase shift, wherein position of the mirror determines the phase shift;
    the waveguide device includes first and second waveguides configured to form an optical coupler;
    the MEMS device includes (i) a first movable mirror optically coupled to the first waveguide and (ii) a second movable mirror optically coupled to the second waveguide;
    the first circulator is configured to optically couple the first input port, the first waveguide, and the first output port;
    the second circulator is configured to optically couple the second input port, the second waveguide, and the second output port;
    each circulator is configured to (a) direct light applied to the corresponding input port into the corresponding waveguide and (b) direct light exiting the corresponding waveguide to the corresponding output port; and
    the apparatus is a 2×2 optical switch.

2. The apparatus of claim 1, wherein change in the position of the mirror changes the phase shift and routing of the light.

3. The apparatus of claim 1, wherein the waveguide and MEMS devices are attached to form a substantially planar structure.

4. The apparatus of claim 3, wherein the MEMS device includes a reservoir adapted to trap adhesive material used for the attachment of the waveguide and MEMS devices.

5. The apparatus of claim 1, wherein the waveguide and MEMS devices are attached by stacking terminal portions of said devices.

6. The apparatus of claim 5, wherein the waveguide device includes a spacer region having a same material as the waveguide and adapted to reduce deformation of an outer surface of the terminal portion of the waveguide device.

7. The apparatus of claim 1, wherein the MEMS device comprises:
  (A) a stationary part, including:
    (1) a substrate; and
    (2) a stationary portion of an actuator rigidly connected to the substrate;
  (B) a movable part supported on the substrate and including:
    (1) the movable mirror;
    (2) a shaft rigidly connected to the mirror; and
    (3) a movable portion of the actuator rigidly connected to the shaft; and
  (C) one or more springs, each connected between the stationary part and the movable part, wherein:
    the actuator is configured to move the movable part relative to the stationary part in response to an electrical signal such that motion of the movable part generates mirror motion parallel to the plane of the substrate.

8. The apparatus of claim 7, wherein:
  the MEMS device is formed in a wafer, comprising first, second, and third layers;
  the first layer comprises the substrate;
  the second layer is formed over the first layer and electrically insulates the first layer from the third layer formed over the second layer; and
  the movable and stationary portions of the actuator, the mirror, and the shaft are formed in the third layer.

9. The apparatus of claim 8, wherein the third layer comprises crystalline silicon and a reflective surface of the mirror is substantially parallel to a (111) crystallographic plane of the silicon.

10. The apparatus of claim 1, wherein the MEMS device is implemented in an integrated device having two or more MEMS devices.

11. The apparatus of claim 1, wherein the movable mirror has a reflective surface that is substantially orthogonal to the plane of the MEMS device.

12. The apparatus of claim 1, wherein the waveguide and MEMS devices are attached such that the plane of the waveguide device is substantially parallel to the plane of the MEMS device.

13. The apparatus of claim 1, wherein, if an input signal is coupled into a selected one of the first and second waveguides,
the optical coupler splits the input signal into (i) a first sub-signal, which is directed to the first mirror, and (ii) a second sub-signal, which is directed to the second mirror;
each of the first and second mirrors reflects the corresponding sub-signal back toward the optical coupler, wherein positions of said mirrors determine a relative phase shift between the reflected sub-signals; and
the reflected sub-signals interact in the optical coupler to form an output signal, wherein the relative phase shift determines for the output signal light distribution between the first and second waveguides.

14. A method of fabricating an apparatus, comprising attaching a planar waveguide device to a planar MEMS device, wherein:
the apparatus, comprises:
the planar waveguide device;
the planar MEMS device;
first and second input ports;
first and second output ports; and
first and second optical circulators, wherein:
the MEMS device includes a movable mirror optically coupled to a waveguide of the waveguide device and adapted to move parallel to the plane of the MEMS device;
the apparatus is adapted to process light based on phase shift, wherein position of the mirror determines the phase shift;
the waveguide device includes first and second waveguides configured to form an optical coupler;
the MEMS device includes (i) a first movable mirror optically coupled to the first waveguide and (ii) a second movable mirror optically coupled to the second waveguide;
the first circulator is configured to optically couple the first input port, the first waveguide, and the first output port;
the second circulator is configured to optically couple the second input port, the second waveguide, and the second output port;
each circulator is configured to (a) direct light applied to the corresponding input port into the corresponding waveguide and (b) direct light exiting the corresponding waveguide to the corresponding output port; and
the apparatus is a 2×2 optical switch.

15. The method of claim 14 wherein:
the attached waveguide and MEMS devices form a substantially planar structure.

16. The method of claim 15, wherein change in the position of the mirror changes the phase shift and routing of the light.

17. The method of claim 15, wherein attaching the waveguide and MEMS devices comprises trapping adhesive material in a reservoir located within the MEMS device.

18. The method of claim 15, wherein attaching the waveguide and MEMS devices comprises stacking terminal portions of said devices.

19. The method of claim 18, wherein the waveguide device includes a spacer region, which provides elevated portions on an outer surface of the terminal portion of the waveguide device to facilitate the attachment of the planar waveguide device to the planar MEMS device.

20. The method of claim 15, further comprising forming the MEMS device in a wafer, wherein:
the wafer comprises a layer of crystalline silicon; and
the mirror is formed in said layer with a reflective surface of the mirror substantially parallel to a (111) crystallographic plane of the silicon.

21. The method of claim 15, wherein the movable mirror has a reflective surface that is substantially orthogonal to the plane of the MEMS device.

22. The method of claim 14, wherein the plane of the waveguide device is substantially parallel to the plane of the MEMS device.

23. The method of claim 14, wherein the movable mirror has a reflective surface that is substantially orthogonal to the plane of the MEMS device.

24. The method of claim 14, wherein, if an input signal is coupled into a selected one of the first and second waveguides,
the optical coupler splits the input signal into (i) a first sub-signal, which is directed to the first mirror, and (ii) a second sub-signal, which is directed to the second mirror;
each of the first and second mirrors reflects the corresponding sub-signal back toward the optical coupler, wherein positions of said mirrors determine a relative phase shift between the reflected sub-signals; and
the reflected sub-signals interact in the optical coupler to form an output signal, wherein the relative phase shift determines for the output signal light distribution between the first and second waveguides.

* * * * *